(12) United States Patent
Geary

(10) Patent No.: US 6,519,894 B1
(45) Date of Patent: Feb. 18, 2003

(54) TANGLE-FREE FISHING LINE ASSEMBLY

(76) Inventor: Christopher L. Geary, P.O. Box 223, Bristol, FL (US) 32321

( * ) Notice: Subject to any disclaimer, the term of this patent is extended or adjusted under 35 U.S.C. 154(b) by 0 days.

(21) Appl. No.: 09/827,744

(22) Filed: Apr. 6, 2001

(51) Int. Cl.[7] .......................... A01K 85/02; A01K 93/00
(52) U.S. Cl. .......................... 43/42.1; 43/41.2; 43/42.4; 43/42.41; 43/43.2; 43/43.4; 43/44.9
(58) Field of Search .............................. 43/34, 35, 42.1, 43/42.41, 41.2, 42.36, 42.39, 44.9, 43.2, 43.1, 44.87; D22/146

(56) References Cited

U.S. PATENT DOCUMENTS

| | | | | |
|---|---|---|---|---|
| 4,359,836 A | * | 11/1982 | Yuji | 43/44.9 |
| 4,891,902 A | * | 1/1990 | Whitney, Jr. | 43/43.11 |
| 5,086,581 A | * | 2/1992 | Barra et al. | 43/26.1 |
| 5,119,578 A | * | 6/1992 | Johnson | 43/17 |
| 5,758,451 A | * | 6/1998 | Wolfe | 43/44.91 |
| 5,784,828 A | * | 7/1998 | Thompson | 43/44.9 |

FOREIGN PATENT DOCUMENTS

| | | | | |
|---|---|---|---|---|
| DE | 2848070 | * | 5/1979 | 43/41.2 |

* cited by examiner

*Primary Examiner*—Bernarr E. Gregory
*Assistant Examiner*—H. A. Blackner

(57) ABSTRACT

A tangle-free fishing line assembly for preventing fishing hooks from getting caught in weeds and other like obstacles. The tangle-free fishing line assembly includes a fishing line; and also includes a hook member being attached at an end of the fishing line; and further includes a weight member being disposed about the fishing line; and also includes stopper members being attached to the fishing line; and further includes a hook guide member being movably disposed about the fishing line for guiding said hook member through weeds in a body of water.

11 Claims, 3 Drawing Sheets

TANGLE-FREE FISHING LINE ASSEMBLY

BACKGROUND OF THE INVENTION

1. Field of the Invention

The present invention relates to a tangle-free fishing line and more particularly pertains to a new tangle-free fishing line assembly for preventing fishing hooks from getting caught in weeds and other like obstacles.

2. Description of the Prior Art

The use of a tangle-free fishing line is known in the prior art. More specifically, a tangle-free fishing line heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,952,444; 2,546,614; 4,760,665; U.S. Pat. No. Des. 405,155; U.S. Pat. Nos. 3,849,928; and 4,237,643.

While these devices fulfill their respective, particular objectives and requirements, the aforementioned patents do not disclose a new tangle-free fishing line assembly. The inventive device includes a fishing line; and also includes a hook member being attached at an end of the fishing line; and further includes a weight member being disposed about the fishing line; and also includes stopper members being attached to the fishing line; and further includes a hook guide member being movably disposed about the fishing line for guiding said hook member through weeds in a body of water.

In these respects, the tangle-free fishing line assembly according to the present invention substantially departs from the conventional concepts and designs of the prior art, and in so doing provides an apparatus primarily developed for the purpose of preventing fishing hooks from getting caught in weeds and other like obstacles.

SUMMARY OF THE INVENTION

In view of the foregoing disadvantages inherent in the known types of tangle-free fishing line now present in the prior art, the present invention provides a new tangle-free fishing line assembly construction wherein the same can be utilized for preventing fishing hooks from getting caught in weeds and other like obstacles.

The general purpose of the present invention, which will be described subsequently in greater detail, is to provide a new tangle-free fishing line assembly which has many of the advantages of the tangle-free fishing line mentioned heretofore and many novel features that result in a new tangle-free fishing line assembly which is not anticipated, rendered obvious, suggested, or even implied by any of the prior art tangle-free fishing line, either alone or in any combination thereof.

To attain this, the present invention generally comprises a fishing line; and also includes a hook member being attached at an end of the fishing line; and further includes a weight member being disposed about the fishing line; and also includes stopper members being attached to the fishing line; and further includes a hook guide member being movably disposed about the fishing line for guiding said hook member through weeds in a body of water.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tangle-free fishing line assembly which has many of the advantages of the tangle-free fishing line mentioned heretofore and many novel features that result in a new tangle-free fishing line assembly which is not anticipated, rendered obvious, suggested, or even implied by any of the prior art tangle-free fishing line, either alone or in any combination thereof.

It is another object of the present invention to provide a new tangle-free fishing line assembly which may be easily and efficiently manufactured and marketed.

It is a further object of the present invention to provide a new tangle-free fishing line assembly which is of a durable and reliable construction.

An even further object of the present invention is to provide a new tangle-free fishing line assembly which is susceptible of a low cost of manufacture with regard to both materials and labor, and which accordingly is then susceptible of low prices of sale to the consuming public, thereby making such tangle-free fishing line assembly economically available to the buying public.

Still yet another object of the present invention is to provide a new tangle-free fishing line assembly which provides in the apparatuses and methods of the prior art some of the advantages thereof, while simultaneously overcoming some of the disadvantages normally associated therewith.

Still another object of the present invention is to provide a new tangle-free fishing line assembly for preventing fishing hooks from getting caught in weeds and other like obstacles.

Yet another object of the present invention is to provide a new tangle-free fishing line assembly which includes a fishing line; and also includes a hook member being attached at an end of the fishing line; and further includes a weight member being disposed about the fishing line; and also includes stopper members being attached to the fishing line; and further includes a hook guide member being movably disposed about the fishing line for guiding said hook member through weeds in a body of water.

Still yet another object of the present invention is to provide a new tangle-free fishing line assembly that is easy and convenient to use for fishing.

Even still another object of the present invention is to provide a new tangle-free fishing line assembly that allows anglers to fish in waters where there are weeds and where most fish tend to lurk about.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
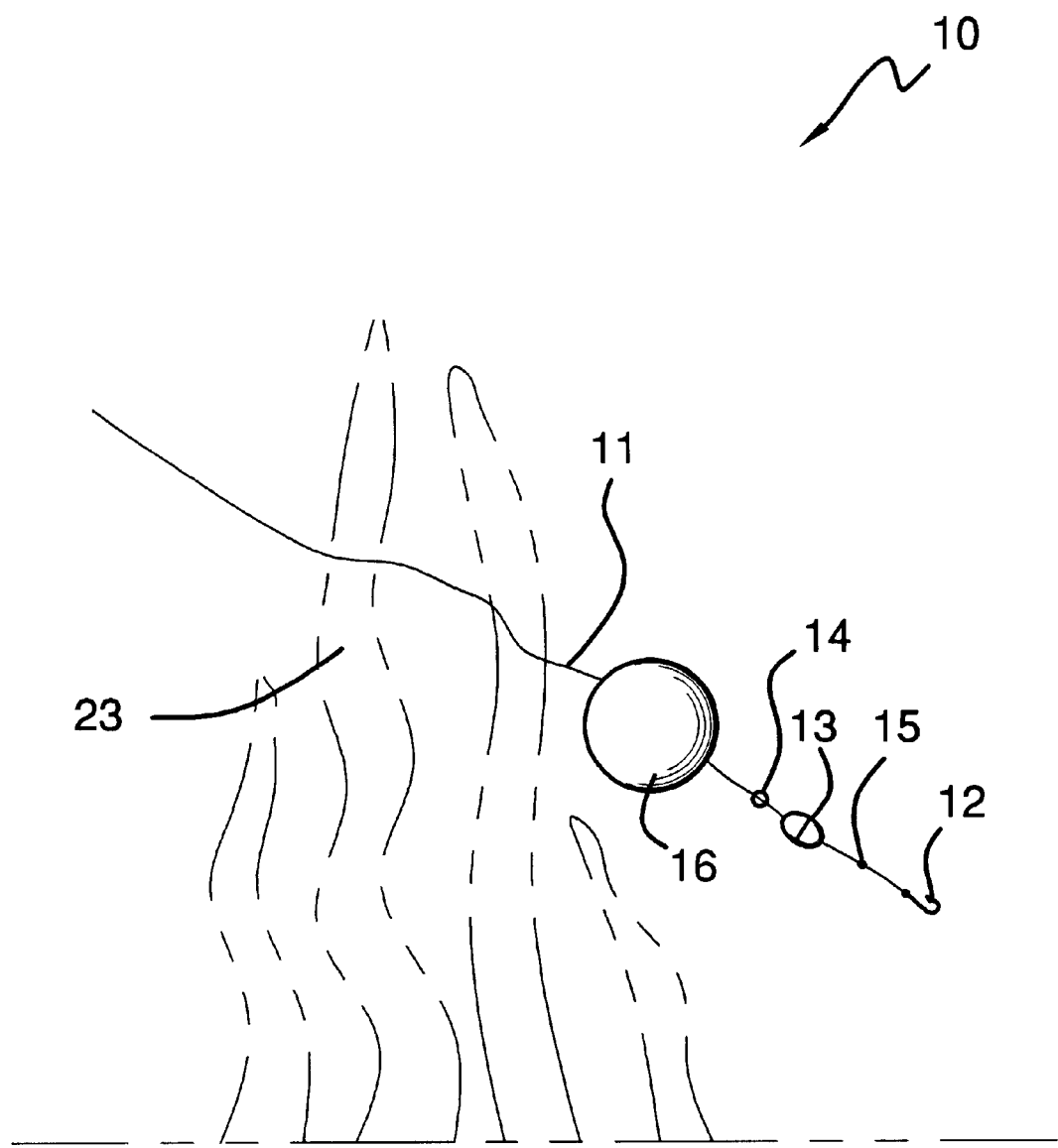
FIG. 1 is a side elevational view of a new tangle-free fishing line assembly according to the present invention and shown in use.
Figure 2:
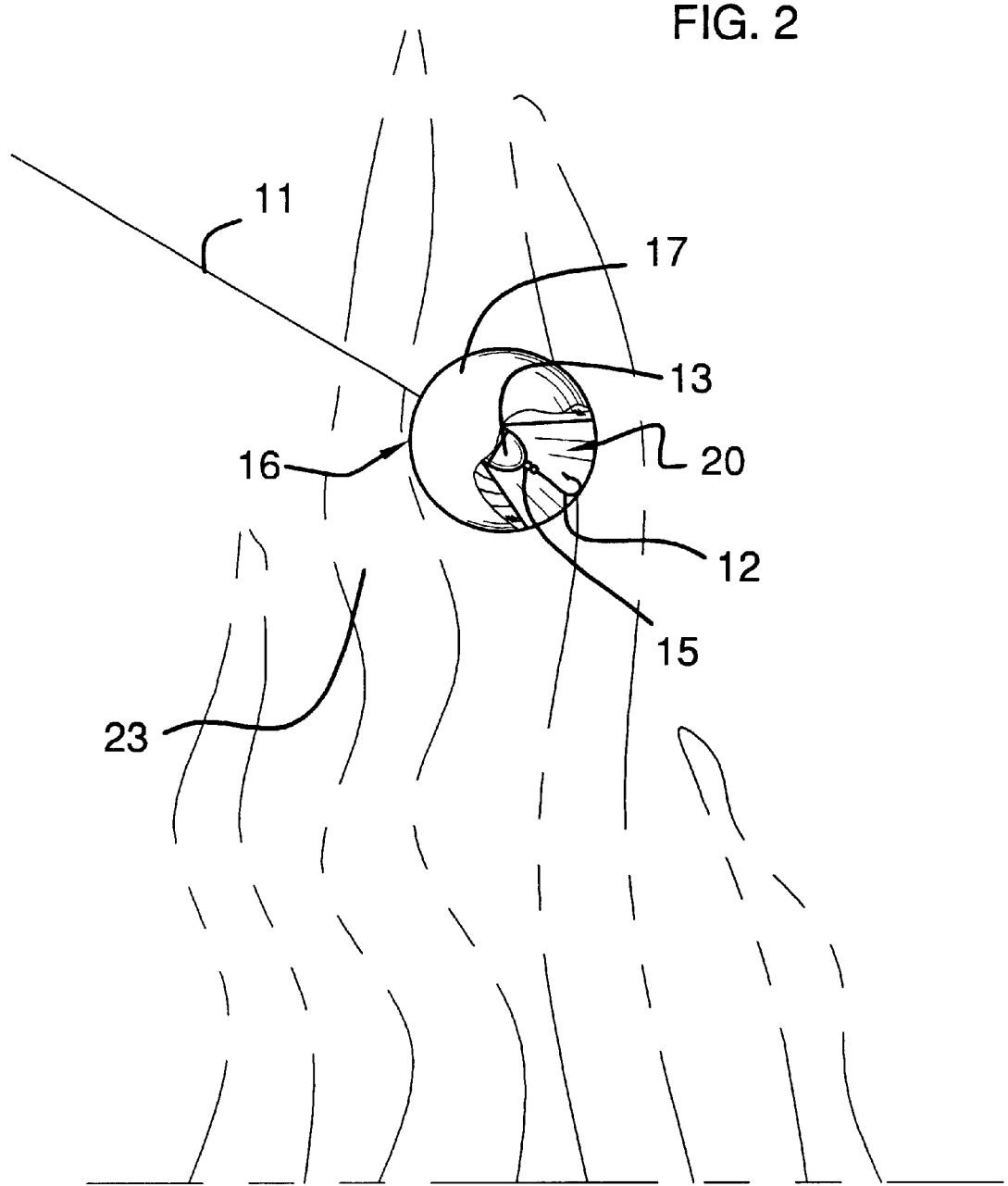
FIG. 2 is another side elevational view of the present invention shown in use.
Figure 3:
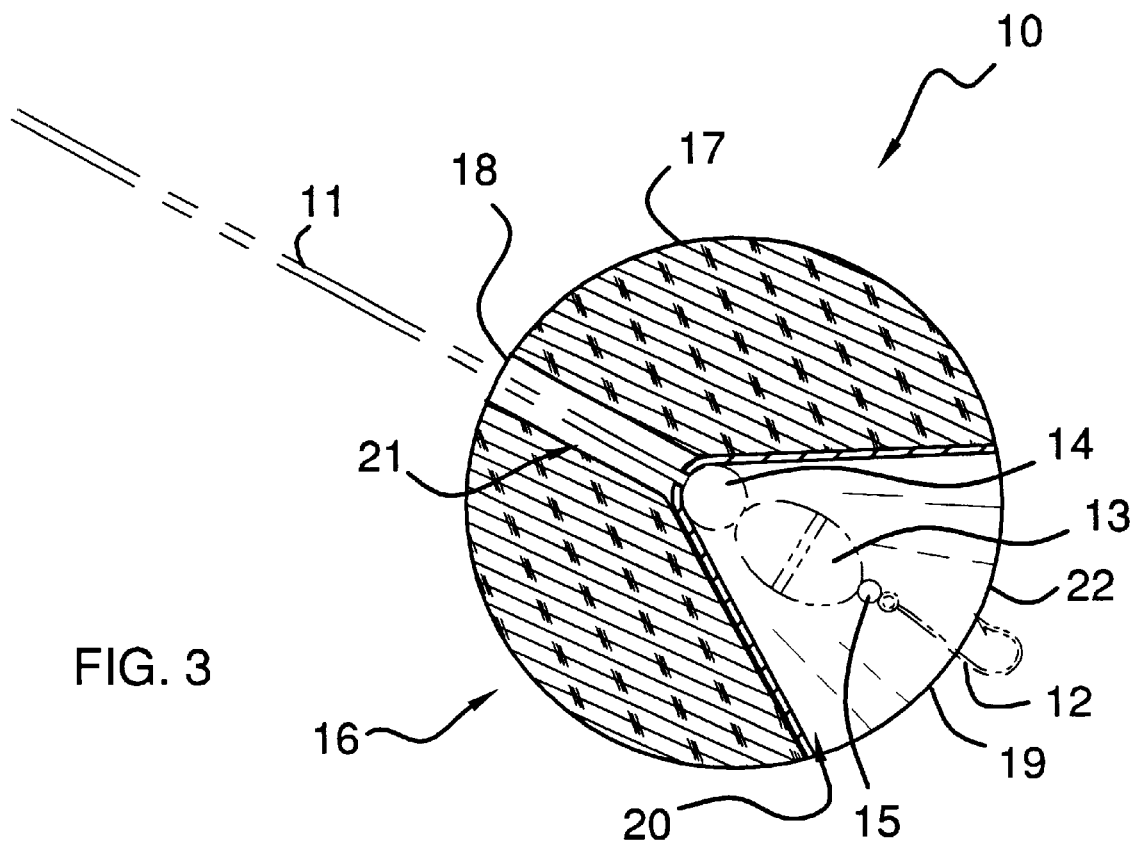
FIG. 3 is a cross-sectional view of the present invention.

With reference now to the drawings, and in particular to FIGS. 1 through 3 thereof, a new tangle-free fishing line assembly embodying the principles and concepts of the present invention and generally designated by the reference numeral 10 will be described.

As best illustrated in FIGS. 1 through 3, the tangle-free fishing line assembly 10 generally comprises a fishing line 11; a hook member 12 being conventionally attached at an end of the fishing line 11; a weight member 13 being conventionally disposed about the fishing line 11; stopper members 14,15 being conventionally attached to the fishing line 11 with the weight member 13 being disposed therebetween; and a hook guide member 16 being movably and conventionally disposed about the fishing line 11 for guiding the hook member 12 through weeds 23 in a body of water. The hook guide member 16 includes a solid spherical member 17 having a top pole 18 and a bottom pole 19 and also having a hook-receiving recessed portion 20 being conventionally disposed in the bottom pole 19. The hook-receiving recessed portion 20 is tapered inwardly of the solid spherical member 17 and is conically-shaped. The solid spherical member 17 has a bore 21 being disposed therethrough and being disposed through the top pole 18 and into the hook-receiving recessed portion 20 with the bore 21 being adapted to receive the fishing line 11 therethrough. The hook guide member 16 includes a flexible membrane 22 conventionally covering the hook-receiving recessed portion 20 and being depressible by the hook member 12 into the hook-receiving recessed portion 20 and having a hole being disposed therethrough and being adapted to receive the fishing line 11. The solid spherical member 17 is made of floatation member including cork material and plastic.

In use, the user casts the fishing line 11 into a body of water with the hook guide member 16 being partially submerged in the body of water. As the user reels in the fishing line 11, the hook member 12, the weight member 13, and the stopper members 14,15 are received in the hook-receiving recessed portion 20 so that the hook member 12 does not catch on the weeds 23 as the hook guide member 16 with its spherical shape easily passing through the weeds with getting caught.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tangle-free fishing line assembly comprising:

a fishing line;

a hook member being attached at an end of said fishing line, said hook member having a pointed end;

a weight member being mounted on said fishing line;

at least one stopper member being attached to said fishing line; and a hook guide member being movably disposed about said fishing line for guiding said hook member through weeds in a body of water;

wherein said hook guide member has a hook-receiving recessed portion formed therein, said hook-receiving recessed portion having a depth into said hook guide member that is sufficient to receive said weight member, said at least one stopper member, and a portion of said hook member including said pointed end of said hook member;

a flexible membrane covering said hook-receiving recessed portion, said flexible membrane being depressible into said hook-receiving recessed portion.

2. A tangle-free fishing line assembly as described in claim 1, wherein said hook guide member includes a spherical member having a top pole and a bottom pole, said hook-receiving recessed portion being disposed in said bottom pole.

3. A tangle-free fishing line assembly as described in claim 2, wherein said hook-receiving recessed portion is tapered inwardly of said spherical member and has a conical shape.

4. A tangle-free fishing line assembly as described in claim 1, wherein said hook guide member has a bore for receiving a portion of said fishing line therein, said bore being disposed therethrough and being in communication with said hook-receiving recessed portion.

5. A tangle-free fishing line assembly comprising:

a fishing line;

a hook member being attached at an end of said fishing line;

a weight member being disposed about said fishing line;

stopper members being attached to said fishing line; and a hook guide member being movably disposed about said fishing line for guiding said hook member through weeds in a body of water;

said hook guide member including a hook-receiving recessed portion and a flexible membrane covering said hook-receiving recessed portion, said flexible membrane being depressible into said hook-receiving recessed portion, said flexible membrane having a hole being disposed therethrough for receiving said fishing line.

6. A tangle-free fishing line assembly as described in claim 5, wherein said hook guide member includes a spherical member having a top pole and a bottom pole, said spherical member having a hook-receiving recessed portion being disposed in said bottom pole.

7. A tangle-free fishing line assembly as described in claim 6, wherein said spherical member comprises a floatation material including cork material and plastic.

8. A tangle-free fishing line assembly as described in claim 6, wherein said hook-receiving recessed portion is tapered inwardly of said spherical member and has a substantially conical shape.

9. A tangle-free fishing line assembly as described in claim 6, wherein said spherical member has a bore for receiving said fishing line therethrough, said bore being disposed therethrough and being disposed through said top pole and into said hook-receiving recessed portion.

10. A tangle-free fishing line assembly as described in claim 1, wherein said flexible membrane has a hole being disposed therethrough and receiving a portion of said fishing line therethrough.

11. A tangle-free fishing line assembly comprising:

a fishing line;

a hook member being attached at an end of said fishing line, said hook member having a pointed end;

a weight member being mounted on said fishing line;

at least one stopper member being attached to said fishing line; and a hook guide member being movably disposed about said fishing line for guiding said hook member through weeds in a body of water;

wherein said hook guide member has a hook-receiving recessed portion formed therein, said hook-receiving recessed portion having a depth into said hook guide member that is sufficient to receive said weight member, said at least one stopper member, and a portion of said hook member including said pointed end of said hook member;

wherein said hook guide member includes a spherical member having a top pole and a bottom pole, said hook-receiving recessed portion being disposed in said bottom pole;

wherein said hook-receiving recessed portion is tapered inwardly of said spherical member and has a conical shape;

wherein said hook guide member has a bore for receiving a portion of said fishing line therein, said bore being disposed therethrough and being in communication with said hook-receiving recessed portion;

wherein said spherical member comprises a floatation material including cork material;

a flexible membrane covering said hook-receiving recessed portion, said flexible membrane being depressible into said hook-receiving recessed portion;

wherein said flexible membrane has a hole being disposed therethrough and receiving a portion of said fishing line therethrough.

\* \* \* \* \*